United States Patent [19]
Thom

[11] 3,741,454
[45] June 26, 1973

[54] PROJECTION APPARATUS

[75] Inventor: Ian Graham Thom, Edinburgh, Scotland

[73] Assignee: Ferranti Limited, Hollinwood, England

[22] Filed: May 17, 1972

[21] Appl. No.: 253,932

[30] Foreign Application Priority Data
May 18, 1971 Great Britain................... 15,510/71

[52] U.S. Cl.................... 226/179, 226/19, 242/57.1
[51] Int. Cl........................................... B65h 17/22
[58] Field of Search....................... 226/179, 19, 20, 226/75, 79; 242/57.1; 353/27

[56] References Cited
UNITED STATES PATENTS
3,102,701  9/1963  Gerber........................... 242/57.1 X
3,407,981  10/1968  Staugaard...................... 226/179 X Primary Examiner—Richard A. Schacher
Attorney—Cameron, Kerkam & Sutton

[57] ABSTRACT

Projection apparatus such as for a moving-map display, has storage means for a length of film and means for moving the film along its length through a projection field. The storage and transport means are mounted on a carriage arranged to move in a transverse direction along at least one guide member. Movement is effected by a motor carried on the carriage and having a capstan drum which engages a taut cable attached to the apparatus parallel to the guide member.

6 Claims, 3 Drawing Figures

PROJECTION APPARATUS

This invention relates to projection apparatus, and particularly to such apparatus in which the area of a film to be projected is selected by both longitudinal and transverse movement of the film in a projection plane.

A requirement such as that specified above arises, for example, in navigational displays of the type referred to as "moving map" displays. In these a map or chart is formed from one or more lengths of the film, and means are provided for moving the film in two mutually perpendicular directions so as to locate the required area for display in the projection plane.

Transport of the film in a longitudinal direction, that is along its own length, presents few problems, since the film may be driven by drive members engaging sprocket holes in the edge of the film. Transverse or cross-film movement on the other hand necessitates the movement of a carriage carrying the film on its storage spools and its longitudinal transport mechanism. Various mechanisms have been employed for this purpose, the most common being the rack-and-pinion and the lead-screw. Both of these, however, are difficult to make with extreme accuracy and without backlash, and since very accurate positioning of the film is essential these mechanisms are not entirely satisfactory.

It is an object of the invention to provide projection apparatus having a simple and effective cross-film transport mechanism.

According to the present invention there is provided projection apparatus for projecting onto a screen an image of visual information carried on part of a length of film which includes storage means for the length of film, transport means for moving the film longitudinally relative to a projection field, at least one guide member located so as to define a direction transverse to said longitudinal direction and parallel to said projection field, a carriage carrying the storage means and the transport means and movable along said guide member in the said transverse direction, a taut cable fixed at its ends and extending parallel to the guide member, a rotatable capstan drum mounted on the carriage and engaging the cable over part at least of its circumference, and means for driving the capstan drum to produce movement of the carriage in the said transverse direction.

An embodiment of the invention, relating to moving-map displays, will now be described with reference to the accompanying drawings, in which.

Figure 1:
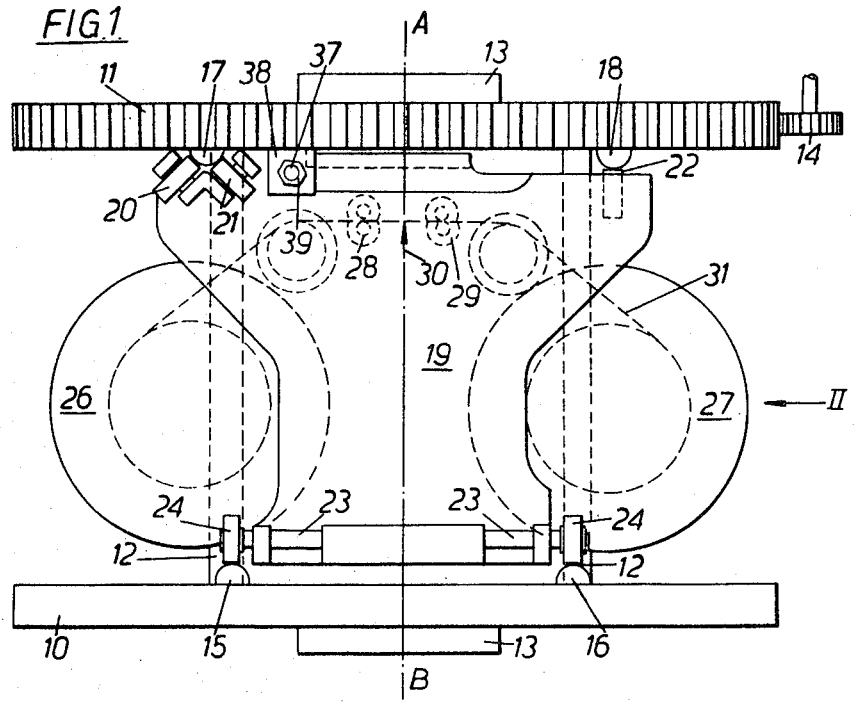
FIG. 1 is a side view of the carriage together with its supporting means.

Referring now to the drawings, the film transport mechanism is built up around a frame which is rotatable about the optical axis AB of the apparatus (FIG. 1). A front plate 10 and a back plate 11 are fastened together by four pillars 12, two of which have been omitted in FIG. 1 for the sake of clarity. Each of the plates is supported in bearings 13 so as to be rotatable about the axis AB. The back plate 11 is in the form of a gear wheel and may be rotated by a pinion 14 driven by a motor (not shown). Secured to the front plate 10 are two guide rails 15 and 16, arranged to be substantially parallel to one another. Two similar guide rails 17 and 18 are secured to the back plate 11.

Figure 3:
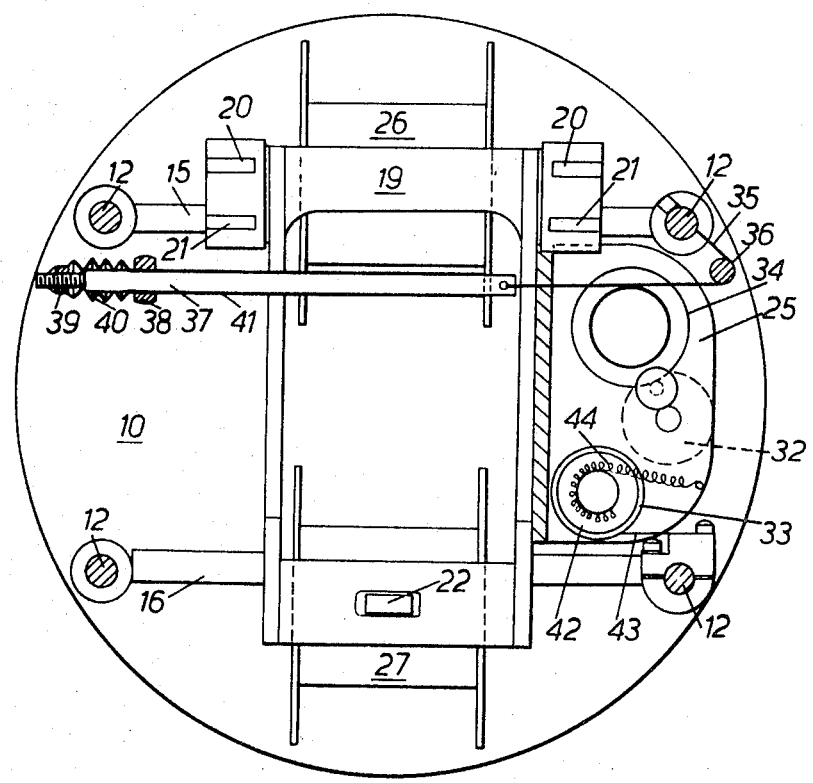
FIG. 3 is a partly cut-away sectional view along the line III—III of FIG. 2.

A carriage 19 is arranged to move along the guide rails in a direction perpendicular to the optical axis AB. In order to position the carriage accurately on the rails, one rail 17 is engaged by two pairs of rollers, the two rollers 20 and 21 of a pair being arranged on substantially perpendicular axes as shown in FIGS. 1 and 3. A single roller 22 on the end of the carriage engages the guide rail 18. The opposite side of the carriage carries four rollers as shown in FIGS. 1 and 3. Two cantilever arms 23 each carry a roller 24 at the outer ends, the arms being tensioned so as to maintain contact between the rollers and the respective guide rails 15 and 16. The guide rail 17 accurately defines the direction of movement of the carriage 19, whilst the other guide rails support the carriage.

As shown, the carriage is basically in the form of an open-sided framework having a wide projecting flange 25 carrying motors and gearing. The main part of the carriage carries two film storage spools 26 and 27, and the various film guide rollers, shown in broken outline in FIG. 1. Two of these guide rollers 28 and 29 define between them the film projection field 30 through which the optical axis AB passes. Transverse movement of the carriage 19 is limited in extent so that the optical light path surrounding the optical axis always passes through part of the film 31.

Figure 2:
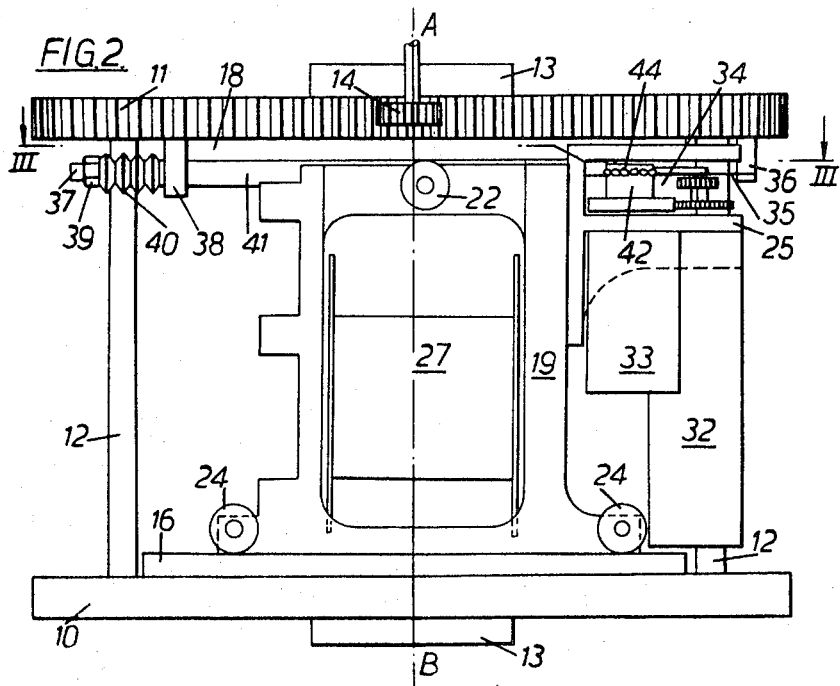
FIG. 2 is a side view of the arrangement of FIG. 1 looking in the direction II.

The means for moving the carriage and for measuring such movement are carried on the flange 25 as indicated in FIG. 2. A motor 32 is used to move the carriage, and a synchro 33 measures such movement as will be described below. The motor 32 drives a capstan drum 34 through a gearbox. The capstan drum 34 has a shallow flat groove formed around it and is engaged by two turns of a cable 35 which is stretched tightly between two points on the main framework so as to extend tangentially to the surface of the drum and parallel to the guide rods 15 and 18. As shown in FIG. 3, one end of the cable 35 is anchored to one of the pillars 12 and is taken around a guide roller 36. The other end of the cable 34 is secured to a tensioning bolt 37 which is anchored to a bracket 38 on back plate 10 by means of a nut 39 and a pile of spring washers 40. A tube 41 is fitted around the bolt 37 with a small clearance and is secured to the bracket 38. The space between the tube 41 and the bolt 37 is filled with a viscous silicone fluid to provide damping for cable vibrations.

Measurement of the carriage movement is performed by the synchro 33, which has a drum 42 carried on its shaft, a thin non-extensible flexible tape 43 is anchored at one end to one of the pillars 12 and has the other end secured to the drum 42 as shown in FIG. 3. A coil spring 44 is anchored to flange 25 of the carriage and is wrapped around drum 42 in the opposite direction to the tape 43, so as to maintain the tape in tension. The tape extends in a direction parallel to the guide rods supporting the carriage.

In operation, movement of the carriage is caused by the motor 32 rotating in the appropriate direction. This causes the capstan drum 34 to wind itself along the cable, thus moving the carriage 19 along the guide rails. The movement causes the tape 43 to be wound onto or unwound from the drum 42, thus rotating the rotor of the synchro and giving an indication of the extent of the movement. Such movement is, as already stated, transverse to the length of the film carried on the spools 26 and 27. Longitudinal movement of the film is caused simply by winding the film from one spool to another. Finally the whole assembly may be rotated about the optical axis by driving the pinion 14.

The various mechanical features of the apparatus may be varied and modified considerably without departing from the main aspect of the invention. The capstan and cable drive for the carriage is simple and effective, and takes up little space. The angle of contact between the cable and the capstan drum need not be 720° as described.

What I claim is:

1. Projection apparatus for projecting onto a screen an image of visual information carried on part of a length of film which includes storage means for the length of film, transport means for moving the film longitudinally relative to a projection field, at least one guide member located so as to define a direction transverse to said longitudinal direction and parallel to said projection field, a carriage carrying the storage means and the transport means and movable along said guide member in the said transverse direction, a taut cable fixed at its ends and extending parallel to the guide member, a rotatable capstan drum mounted on the carriage and engaging the cable over part at least of its circumference, and means for driving the capstan drum to produce movement of the carriage in the said transverse direction.

2. Apparatus as claimed in claim 1 in which the taut cable engages the circumference of the capstan drum over an angle of 720°.

3. Apparatus as claimed in claim 1 which includes means for damping vibrations of the taut cable.

4. Apparatus as claimed in claim 1 which includes means for determining the position of the carriage.

5. Apparatus as claimed in claim 4 in which the means includes a synchro carrying on its rotor shaft a spring-loaded drum to which is attached one end of a measuring element.

6. Apparatus as claimed in claim 5 in which the measuring element is a non-extensible flexible tape.

* * * * *